(12) United States Patent
Hu

(10) Patent No.: US 7,839,127 B2
(45) Date of Patent: Nov. 23, 2010

(54) POWER SUPPLY CIRCUIT FOR MOTHERBOARD

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 253 days.

(21) Appl. No.: 12/126,765

(22) Filed: May 23, 2008

(65) Prior Publication Data

US 2009/0259860 A1 Oct. 15, 2009

(30) Foreign Application Priority Data

Apr. 9, 2008 (CN) .................. 2008 1 0300936

(51) Int. Cl.
*G05F 1/00* (2006.01)
(52) U.S. Cl. ...................... 323/266; 713/300
(58) Field of Classification Search .............. 323/266, 323/272–275, 282–284; 713/300, 320–323
See application file for complete search history.

(56) References Cited

U.S. PATENT DOCUMENTS

| 5,268,845 A * | 12/1993 | Startup et al. ............ 323/275 |
| 5,546,589 A * | 8/1996 | Odaira ....................... 713/340 |
| 5,657,257 A * | 8/1997 | Lee ............................ 713/321 |
| 6,198,262 B1 * | 3/2001 | Squibb et al. ............... 323/273 |
| 6,691,224 B1 * | 2/2004 | Yeh et al. ....................... 713/2 |
| 6,910,140 B2 * | 6/2005 | Sanchez ..................... 713/321 |
| 6,963,984 B2 * | 11/2005 | Shiga ......................... 713/310 |
| 2008/0203982 A1 * | 8/2008 | Chen et al. ................. 323/266 |
| 2009/0085554 A1 * | 4/2009 | Hu et al. ..................... 323/353 |
| 2009/0259859 A1 * | 10/2009 | Zou et al. ................... 713/300 |

* cited by examiner

*Primary Examiner*—Adolf Berhane
*Assistant Examiner*—Yemane Mehari
(74) *Attorney, Agent, or Firm*—D. Austin Bonderer

(57) ABSTRACT

A power supply circuit for a motherboard includes an input/output (I/O) controller, a power circuit providing a working voltage for the I/O controller, and a first resistor. The I/O controller includes an I/O controller voltage pin and an I/O controller case open detection (COPEN) pin. The power circuit includes an input, a first output, a second output, and a GND pin. The input of the power circuit is connected to a standby power supply; and the first output of the power circuit is connected to the I/O controller voltage pin. The second output of the power circuit is connected to the I/O controller COPEN pin via the first resistor; and the GND pin of the power circuit is grounded.

5 Claims, 1 Drawing Sheet

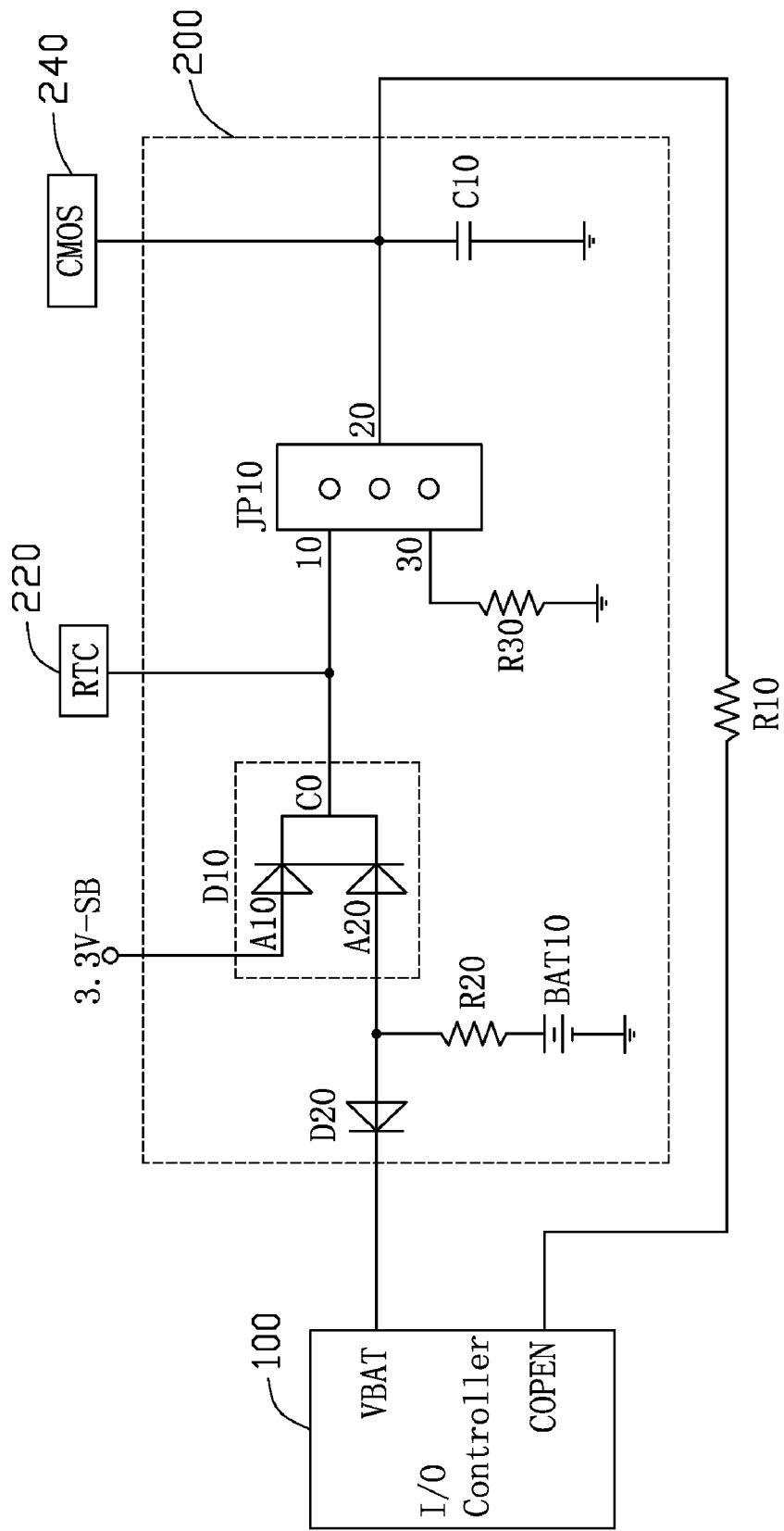

POWER SUPPLY CIRCUIT FOR MOTHERBOARD

BACKGROUND

1. Field of the Invention

The present invention relates to power supply circuits, and particularly to a power supply circuit for motherboard in computer.

2. Description of Related Art

In electronics and particularly in computer electronics, motherboards are one of the most important parts in computers. Power supply circuits provide working voltages for electronic components on motherboards, and are absolutely necessary, especially for input/output (I/O) controllers. I/O controllers are configured to control temperature of CPUs and rotation speed of computer fans, and maintain a normal function of a mouse and a keyboard, and so on. However, voltage provided to I/O controllers may not be stable with the present state of technology, which may result in abnormal functioning by the I/O controllers.

What is needed, therefore, is to provide a power supply circuit for a motherboard which can overcome the above mentioned problems.

SUMMARY

An embodiment of a power supply circuit for a motherboard includes an input/output (I/O) controller, a power circuit providing a working voltage for the I/O controller, and a first resistor. The I/O controller includes an I/O controller voltage pin and an I/O controller case open detection (COPEN) pin. The power circuit includes an input, a first output, a second output, and a GND pin. The input of the power circuit is connected to a standby power supply; and the first output of the power circuit is connected to the I/O controller voltage pin. The second output of the power circuit is connected to the I/O controller COPEN pin via the first resistor; and the GND pin of the power circuit is grounded.

Other advantages and novel features of the present invention will become more apparent from the following detailed description of preferred embodiment when taken in conjunction with the accompanying drawing, in which:

BRIEF DESCRIPTION OF THE DRAWING

The figure is a circuit diagram of an embodiment of a power supply circuit for a motherboard in accordance with the present invention.

DETAILED DESCRIPTION

Referring to the figure, a power supply circuit for a motherboard in accordance with an embodiment of the present invention is configured to supply power to an input/output (I/O) controller 100. The power supply circuit includes a power circuit 200, and a first resister R10. The I/O controller 100 includes a voltage battery (VBAT) pin and a case open detection (COPEN) pin. The VBAT pin is connected to the COPEN pin via the power circuit 200 and the first resister R10.

The power circuit 200 includes a battery BAT10 providing direct current (DC) voltage, a second resister R20, a Schottky diode D10, a diode D20, a jumper device JP10, a third resister 30, and a capacitor C10. The cathode of the diode D20 is connected to the VBAT pin of the I/O controller 100. The anode of the diode D20 is connected to one end of the second resister R20. The other end of the second resister R20 is connected to an anode of the battery BAT10. A cathode of the battery BAT10 is grounded. The Schottky diode D10 includes a first anode A10, a second anode A20, and a cathode C0. The first anode A10 of the Schottky diode D10, functioning as an input of the power circuit 200, is connected to a standby power supply 3.3V-SB. The second anode A20 of the Schottky diode D10, functioning as a first output of the power circuit 200, is connected to the anode of the diode D20. The cathode of the diode D20 is connected to the VBAT pin of the I/O controller 100. The cathode C0 of the Schottky diode D10, functioning as a second output of the power circuit 200, is connected to the COPEN pin of the I/O controller 100 via the jumper device JP10 and the first resister R10. The jumper device JP10 includes a first pin 10, a second pin 20, and a third pin 30. The first pin 10 of the jumper device JP10 is connected to the cathode C0 of the Schottky diode D10 and a real-time clock (RTC) 220 on the motherboard. The second pin 20 of the jumper device JP10 is connected to one end of the capacitor C10 and a complementary metal oxide semiconductor (CMOS) 240 on the motherboard, and also connected to the COPEN pin of the I/O controller 100 via the first resister R10. The other end of the capacitor C10 is grounded. The third pin 30 of the jumper device JP10 is grounded via the third resister R30. The capacitor C10 is configured for wave filtering and eliminating or reducing influence of noise signals.

Generally, the second pin 20 of the jumper device JP10 is connected to the first pin 10 via a jumper block (not shown) to maintain power to the CMOS 240 thus safeguarding information stored therein. When it is necessary to clear the CMOS 240, the second pin 20 of the jumper device JP10 is connected to the third pin 30. The COPEN pin of the I/O controller 100 receives a case open signal when the case is opened, and a register (not shown) in the I/O controller 100 stores the case open signal and activates an alarm when the user reboots the computer for telling the user that the case is open.

When the advanced technology extended (ATX) power at the computer is activated, the standby power supply 3.3V-SB provides working voltages for the RTC 220, the CMOS 240, and the COPEN pin of the I/O controller 100 via the Schottky diode D10, while the battery BAT10 provides a working voltage about 3.3V for the VBAT pin of the I/O controller 100 to ensure the I/O controller 100 works normally. When the ATX power at the computer is deactivated, the battery BAT10 provides working voltages for the RTC 220, the CMOS 240, the COPEN pin of the I/O controller 100 via the Schottky diode D10. It also provides a working voltage about 3.3V for the VBAT pin of the I/O controller 100 to ensure the I/O controller 100 works normally.

In this embodiment, the VBAT pin of the I/O controller 100 is connected to the COPEN pin of the I/O controller 100 via the first resister R10 and the power circuit 200. The voltage at the COPEN pin of the I/O controller 100 does not affect the voltage at the VBAT pin of the I/O controller 100. Thereby the power circuit 200 provides a stable working voltage for the I/O controller 100.

In other embodiments, the COPEN pin of the I/O controller 100 can be connected to the cathode C0 of the Schottky diode D10 directly via the first resister R10. Thereby the COPEN pin of the I/O controller 100 is connected to the VBAT pin of the I/O controller 100 via the Schottky diode D10 and the diode D20. In this way the power circuit 200 is also capable of providing a stable working voltage to the I/O controller 100.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit for motherboard, comprising:
    a first resistor;
    an input/output (I/O) controller comprising an I/O controller voltage pin and an I/O controller case open detection (COPEN) pin; and
    a power circuit capable of providing a stable working voltage for the I/O controller, comprising:
        an input connected to a standby power supply;
        a first output connected to the I/O controller voltage pin;
        a second output connected to the I/O controller COPEN pin via the first resistor; and
        a GND pin grounded;
        a battery, capable of providing direct current voltages, comprising a battery anode and a battery cathode; and
        a Schottky diode comprising a Schottky first anode, a Schottky second anode, and a Schottky cathode;
        wherein the Schottky first anode serves as the input of the power circuit and is connected to the standby power supply; the Schottky second anode serves as the first output of the power circuit and is connected to the battery anode and the I/O controller voltage pin; the battery cathode is grounded; and the Schottky cathode serves as the second output of the power circuit and is connected to the I/O controller COPEN via the first resister.

2. The power supply circuit for motherboard as claimed in claim 1, wherein the power circuit further comprises:
    a diode comprising a diode cathode connected to the voltage pin of I/O controller;
    a diode anode connected to the second anode of the Schottky diode; and
    a second resistor;
    wherein the diode anode is connected to the battery anode via the second resister.

3. The power supply circuit for motherboard as claimed in claim 1, wherein the power circuit further comprises a capacitor comprising a capacitor first end, connected to the second output of power supply circuit and the I/O controller COPEN pin via the first resister, and a capacitor second end that is grounded.

4. The power supply circuit for motherboard as claimed in claim 1, wherein the power circuit further comprises a jumper device comprising:
    a jumper first pin that is connected to the Schottky cathode and a real-time clock (RTC) on the motherboard;
    a jumper second pin connected to a complementary metal oxide semiconductor(CMOS), and the I/O controller COPEN pin via the first resister; and
    a jumper third pin that is grounded via a third resister.

5. The power supply circuit for motherboard as claimed in claim 4, wherein the power circuit further comprises a capacitor comprising a capacitor first end connected to the jumper second pin, and a capacitor second end that is grounded.

* * * * *